US010126972B1

United States Patent
Healey et al.

(10) Patent No.: US 10,126,972 B1
(45) Date of Patent: Nov. 13, 2018

(54) METHOD AND APPARATUS FOR BLOCK LEVEL DATA DE-DUPLICATION

(71) Applicant: EMC Corporation, Hopkinton, MA (US)

(72) Inventors: Michael W. Healey, North Grosvenordale, CT (US); J. Michael Dunbar, Brimfield, MA (US); Avinash Kallat, Marlborough, MA (US); Michael Craig Fishman, Southboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 845 days.

(21) Appl. No.: 13/901,062

(22) Filed: May 23, 2013

Related U.S. Application Data (63) Continuation of application No. 13/447,048, filed on Apr. 13, 2012, now Pat. No. 8,478,951, which is a continuation of application No. 12/347,447, filed on Dec. 31, 2008, now Pat. No. 8,200,923.

(51) Int. Cl.
G06F 3/06 (2006.01)

(52) U.S. Cl.
CPC .......... *G06F 3/0641* (2013.01); *G06F 3/0608* (2013.01); *G06F 3/0683* (2013.01)

(58) Field of Classification Search
None
See application file for complete search history.

(56) References Cited

U.S. PATENT DOCUMENTS

| 7,472,242 | B1 | 12/2008 | Deshmukh et al. |
| 7,685,459 | B1 | 3/2010 | De Spiegeller et al. |
| 7,747,584 | B1 | 6/2010 | Jernigan, IV |
| 8,117,464 | B1 * | 2/2012 | Kogelnik ............ H04L 63/0428 380/284 |

(Continued)

OTHER PUBLICATIONS

Zhu et al., "Avoiding the disk bottleneck in the data domain deduplication file system," *Proceedings 6th USENIX Conference on File and Storage Technologies (FAST '08)*, Mary Baker and Erik Riedel eds., USENIX Association, Berkeley, California USA, 2008, Article 18, 14 pages.

(Continued)

*Primary Examiner* — Edward J Dudek, Jr.
*Assistant Examiner* — Ralph A Verderamo, III
(74) *Attorney, Agent, or Firm* — Krishnendu Gupta; Robert Kevin Perkins (57) ABSTRACT

Techniques for performing de-duplication for data blocks in a computer storage environment. At least one chunking/hashing unit receives input data from a source and processes it to output data blocks and content addresses for them. In one aspect, the chunking/hashing unit outputs all blocks without checking to see whether any is a duplicate of a block previously stored on the storage environment. In another aspect, each data block is processed by one of a plurality of distributed object addressable storage (OAS) devices that each is selected to process data blocks having content addresses with a particular range. The OAS devices determine whether each received data block is a duplicate of another previously stored on the computer storage environment, and when it is not, stores the data block.

15 Claims, 5 Drawing Sheets

(56) References Cited

U.S. PATENT DOCUMENTS

| | | |
|---|---|---|
| 2005/0193084 A1* | 9/2005 | Todd .................. G06F 3/0607 709/214 |
| 2007/0239946 A1 | 10/2007 | Zhu |
| 2007/0255758 A1 | 11/2007 | Zheng et al. |
| 2008/0005141 A1 | 1/2008 | Zheng et al. |
| 2008/0034268 A1 | 2/2008 | Dodd et al. |
| 2008/0098083 A1 | 4/2008 | Shergill et al. |
| 2009/0083610 A1* | 3/2009 | Arai .................. G06F 3/0608 714/807 |
| 2009/0254609 A1 | 10/2009 | Wideman |
| 2010/0042790 A1 | 2/2010 | Mondal et al. |

OTHER PUBLICATIONS

Kulkarni et al., "Redundancy elimination within large collections of files," *Proceedings Annual Conference on USENIX Annual Technical Conference (ATEC '04)*, USENIX Association, Berkeley, California, USA, 2004, 5-5.

Douglis et al., "Application-specific Delta-encoding via Resemblance Detection," USENIX Technical Conference 2003, retrieved Jun. 27, 2011 from http://www.research.ibm.com/people/i/yengar/usenix03.pdf.

\* cited by examiner

METHOD AND APPARATUS FOR BLOCK LEVEL DATA DE-DUPLICATION

RELATED APPLICATIONS

This application claims the benefit under 35 U.S.C. § 120 and is a continuation of U.S. patent application Ser. No. 13/447,048 filed Apr. 13, 2012 and entitled "Method and Apparatus for Block Level Data De-Duplication," which claims the benefit under 35 U.S.C. § 120 and is a continuation of U.S. patent application Ser. No. 12/347,447 filed Dec. 31, 2008 and entitled "Method and Apparatus for Block Level Data De-Duplication," the entire contents of both of which is incorporated herein by reference.

BACKGROUND OF INVENTION

1. Field of Invention

The techniques described herein are directed generally to the field of computer storage, and more particularly to techniques for performing data de-duplication in a computer storage environment.

2. Description of the Related Art

Backup systems exist that access data from one or more data sources in a computer system and write the data to a backup storage environment wherein the data is stored on one or more backup storage media. In this manner, if it is desired to retrieve any of the data that existed on the computer system at the time the backup was made (e.g., to restore the computer system data to a known good state, in response to a crash of the computer system that results in a loss of data, etc.), the data can be retrieved from the backup storage system.

It has been recognized that in a backup system, there often is redundancy (also referred to as duplication) between data that is being backed up to the backup system and other data that was previously backed up and already is stored on the backup system. For example, depending upon how the backup system is configured, weekly full backups of a computer system may be performed, and from one week to the next, only a small percentage (e.g., 5%) of the data stored in the computer system may be changed, with a large percentage (e.g., 95%) remaining unchanged. Thus, if two full backup operations are performed in back-to-back weeks, a large percentage (e.g., 95%) of the data stored to the backup storage environment during the second backup operation may be redundant, as the data is already securely stored on the backup storage environment. This redundancy may be compounded each time a new backup operation is performed on the data set. For example, using the example of weekly backups, over the course of a year, fifty-two copies of some data may be stored to the backup storage system.

Redundancy in data stored to a backup storage system can also result in other ways. For example, if an e-mail system is being backup up and there are numerous e-mails with the same attachment, backing up all of the e-mails may result in backing up the attachment multiple times. As another example, even when a logical object of data (e.g., a file) is modified in the period of time between two different backup operations, it may often be the case that only a small portion of the data in the logical object is modified. For example, for a relatively large file, if only a small number of bytes are modified, the majority of the bytes in the file may remain unchanged, such that there is redundancy and duplication for the unchanged bytes if they are backed up multiple times.

In view of the foregoing, data de-duplication processes have been developed for backup storage systems. The purpose of a conventional de-duplication process is to identify when a backup process is seeking to backup data that has already been stored on the backup system, and to refrain from backing up the data again to avoid duplication of the data stored on the backup system. This reduces the storage resources used by the backup storage system and results in a cost saving.

Figure 1:
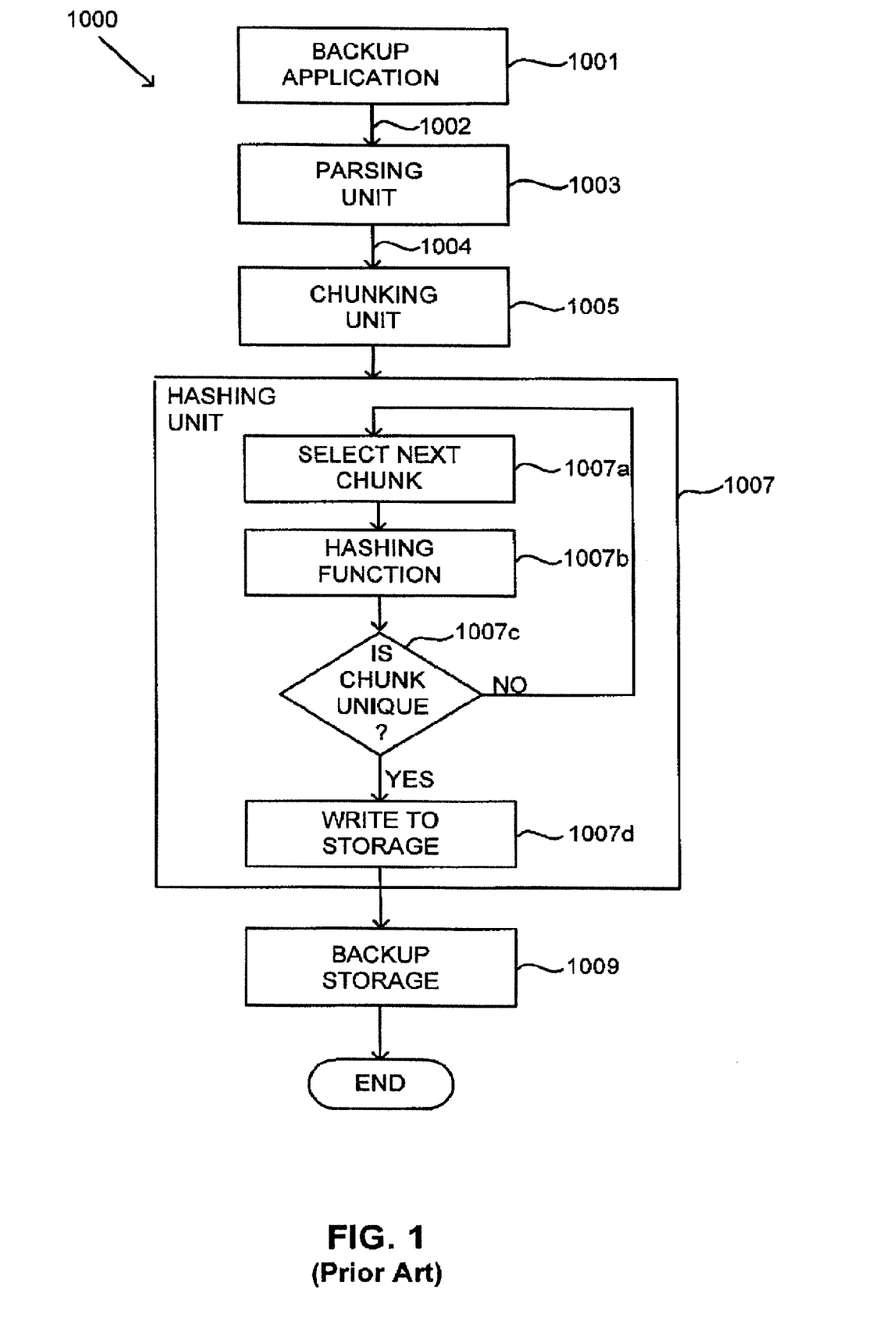
FIG. 1 is a block diagram of a conventional system for performing data de-duplication.

A conventional de-duplication system 1000 is illustrated in FIG. 1. A backup application 1001 provides to a parsing unit 1003 a backup data stream 1002 of data to be backed up. The parsing unit 1003 removes and stores (to backup storage 1009) metadata in the backup data stream 1002 that the backup application 1001 inserts along with the data being backed up to enable the backup data to be stored and retrieved by the backup application 1001. The parsing unit 1003 provides a raw data stream of backup data 1004 (absent the metadata) to be backed up to a chunking unit 1005. The purpose for the chunking unit 1005 is to divide the raw stream of backup data 1004 into a number of discrete chunks (also referred to as blocks) of data. The sizes of the chunks or blocks may vary, but many chunking units 1005 produce blocks of data that are smaller than the size of a conventional logical object (e.g., a file) being backed up so that redundancy in the data in sub-portions of the logical object can be detected.

The data blocks or chunks output from the chunking unit 1005 are provided to a hashing unit 1007. The hashing unit 1007 performs a number of functions as shown in blocks 1007a-d. Initially, in block 1007a, the hashing unit selects an individual chunk to be operated upon, and passes the selected chunk to a hashing function 1007b which performs a hash operation on the chunk to generate an object identifier (also referred to as a content address) for the chunk. The hashing unit 1007b applies a hashing algorithm that seeks to generate distinct identifiers for chunks of data that differ in any respect, but generates the same identifier for chunks of data that are identical. Once a hash for a chunk is generated, a determination is made, as shown at block 1007c, of whether the chunk is unique. This determination typically is made by accessing a lookup table that is maintained by the hashing unit 1007 and includes the content addresses for all of the chunks of data previously stored on the backup storage system 1009. If the content address for the chunk of data is already stored in the lookup table, it signifies that the chunk is already stored on the backup storage environment and therefore is not unique. In that circumstance, the data chunk need not be stored to the backup storage environment again, so that the hashing unit 1007 merely stores a pointer to where the chunk of data is stored, and then returns to block 1007a wherein the next chunk is selected for processing. Conversely, when it is determined by the hashing unit at block 1007c that the chunk is unique, a write is issued at block 1007d to the backup storage system 1009 to store the new chunk of data thereon.

SUMMARY OF INVENTION

One embodiment is directed to a computer storage environment comprising at least one chunking/hashing unit that receives input data from at least one source, wherein the at least one chunking/hashing unit processes at least some of the input data to output a plurality of data blocks from the at least some of the input data and a content address for each of the plurality of data blocks, wherein a content address for a corresponding data block is generated based, at least in part, on the content of the corresponding data block. The computer storage environment further comprises a plurality of object addressable storage devices to store at least some of the plurality of data blocks output from the at least one chunking/hashing unit. The computer storage environment comprises at least one processor programmed to, for each one of the plurality of data blocks output from the at least one chunking/hashing unit, make a determination as to which of the plurality of object addressable storage devices is to control storage of the one of the plurality of data blocks output from the at least one chunking/hashing unit. Each of the plurality of object addressable storage devices comprises at least one processor programmed to, in response to receipt from the at least one chunking/hashing unit of a received one of the plurality of data blocks: determine whether the received one of the plurality of data blocks is a duplicate of another data block previously stored on the computer storage environment; and control storage of the received one of the plurality of data blocks on the computer storage environment when it is determined that the received one of the plurality of data blocks is not a duplicate of another data block previously stored on the computer storage environment.

Another embodiment is directed to an object addressable storage system for use in a computer storage environment that includes at least one chunking/hashing unit that receives input data from at least one source and processes at least some of the input data to output a plurality of data blocks from the at least some of the input data and a content address for each of the plurality of data blocks, wherein a content address for a corresponding data block is generated based, at least in part, on the content of the corresponding data block. The storage system comprises at least one storage medium and at least one processor. The at least one processor is programmed to: provide an object addressable storage interface that receives at least some of the plurality of data blocks output from the at least one chunking/hashing unit; and in response to receipt from the at least one chunking/hashing unit of a received one of the plurality of data blocks, determine whether the received one of the plurality of data blocks is a duplicate of another data block previously stored on the object addressable storage system; and store the received one of the plurality of data blocks on the at least one storage medium when it is determined that the received one of the plurality of data blocks is not a duplicate of another data block previously stored on the object addressable storage system.

A further embodiment is directed to a method comprising acts of: (A) processing at least some received input data to output a plurality of data blocks from the at least some of the input data and a content address for each of the plurality of data blocks, wherein a content address for a corresponding data block is generated based, at least in part, on the content of the corresponding data block; (B) processing each one of the plurality of data blocks at one of a plurality of object addressable storage devices, determined from among the plurality of object addressable storage devices based upon the content address of the one the plurality of data blocks, to determine whether the one of the plurality of data blocks is a duplicate of another data block previously stored on the plurality of object addressable storage devices; and (C) storing on at least one of the plurality of object addressable storage devices each one of the plurality of data blocks determined in the act (B) to not be a duplicate of another data block previously stored on the plurality of object addressable storage devices.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have recognized that conventional de-duplication processes suffer from a significant bottleneck in performance due to the manner in which the systems determine whether a data block or chunk is unique or has previously been stored to the backup storage environment (e.g., the decision at block 1007c in FIG. 1). In this respect, Applicants have appreciated that for large data sets, the data structures used by the hashing unit 1007 to determine whether a newly received data chunk or block is unique can become very large (e.g., including billions of entries and hundreds of gigabytes of storage). Such data structures typically include a hash table or tree structure that is searched to determine whether the structure already contains the content address or identifier for a newly processed block, but that searching process can be very time-consuming. Thus, Applicants have appreciated that this step in the de-duplication process typically is the performance bottleneck for a backup process that seeks to perform data de-duplication. Applicants also have appreciated that the performance of conventional de-duplication processes is further exacerbated by the fact that the data structure (e.g., a hash lookup table or tree) used to determine uniqueness for each chunk can grow to a size that exceeds the memory capacity of the processor (e.g., of the hashing unit 1007) that performs the processing of the data structure to determine whether a newly processed chunk or data block is unique. This can further slow the performance of the system, as the processor may have to repeatedly retrieve portions of the data structure from disk when performing its analysis of whether a newly processed chunk is unique, which further slows the process.

In accordance with one embodiment of the present invention, Applicants have appreciated that the performance of a de-duplication process and/or system can be improved by modifying the manner in which a determination is made as to whether a newly processed chunk of data is unique. In accordance with one embodiment of the present invention, rather than having this uniqueness determination performed by a hashing unit that issues a write operation to the storage environment only after determining uniqueness, the determination is made by the storage environment itself. In this manner, the other components of the de-duplication system (e.g., the parsing, chunking and hashing units) can process the input data stream (e.g., 1002 in FIG. 1) more quickly, as they simply issue writes to the data storage environment for each data block once its content address or object identifier has been created, having been alleviated of the burden of performing the time-intensive determination of whether the chunk or data block is unique.

In accordance with another embodiment of the present invention, the determination of whether a newly received chunk or block of data is unique is performed by a plurality of distributed components (e.g., storage devices within the storage environment). In this manner each of the distributed components for performing this identification may be assigned to handle a subset of the unique identifiers (e.g., content addresses) for the data blocks to be stored to the storage environment. Thus, the data structure that stores the identifiers for data blocks already stored on the storage environment may be divided into a number of smaller pieces. In this manner, determinations of uniqueness can be performed in parallel for a plurality of data blocks or chunks, thereby increasing the throughput of the data de-duplication system. In addition, in accordance with some embodiments of the present invention, the data structure that identifies the content units already stored on the storage environment can be divided into sufficiently small pieces that are capable of being retained in the main memory of a computer that performs the processing of the data structure, to avoid the necessity of going to disk to retrieve portions of the data structure when determining whether a new data block is a duplicate of one previously stored, thereby further increasing the performance and throughput of the system. However, it should be appreciated that not all embodiments are limited in this respect.

The aspects of the present invention described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for the techniques described herein is for use in a backup system, to perform data de-duplication on data being stored to a backup storage environment. However, it should be appreciated that the aspects of the present invention described herein are not limited in this respect, and can be used with numerous other types of computer storage environments other than backup storage environments. In this respect, while the source of the data to be stored to the storage environment in some of the examples described herein is from a backup application, it should be appreciated that the data may be sourced from any suitable source, including application programs that store data to a main production storage environment as opposed to a backup storage environment.

When used in connection with a backup system, the aspects of the present invention described herein can be used with any suitable backup system. Examples of backup systems with which the aspects of the present invention described herein can be used include those that include one or more backup applications (e.g., like that shown at 1001 in FIG. 1) that operate on one or more backup servers and a backup storage environment that includes one or more backup storage systems employing any suitable type of storage media, including tape, hard disk drives or any other suitable type of storage media.

Figure 2:
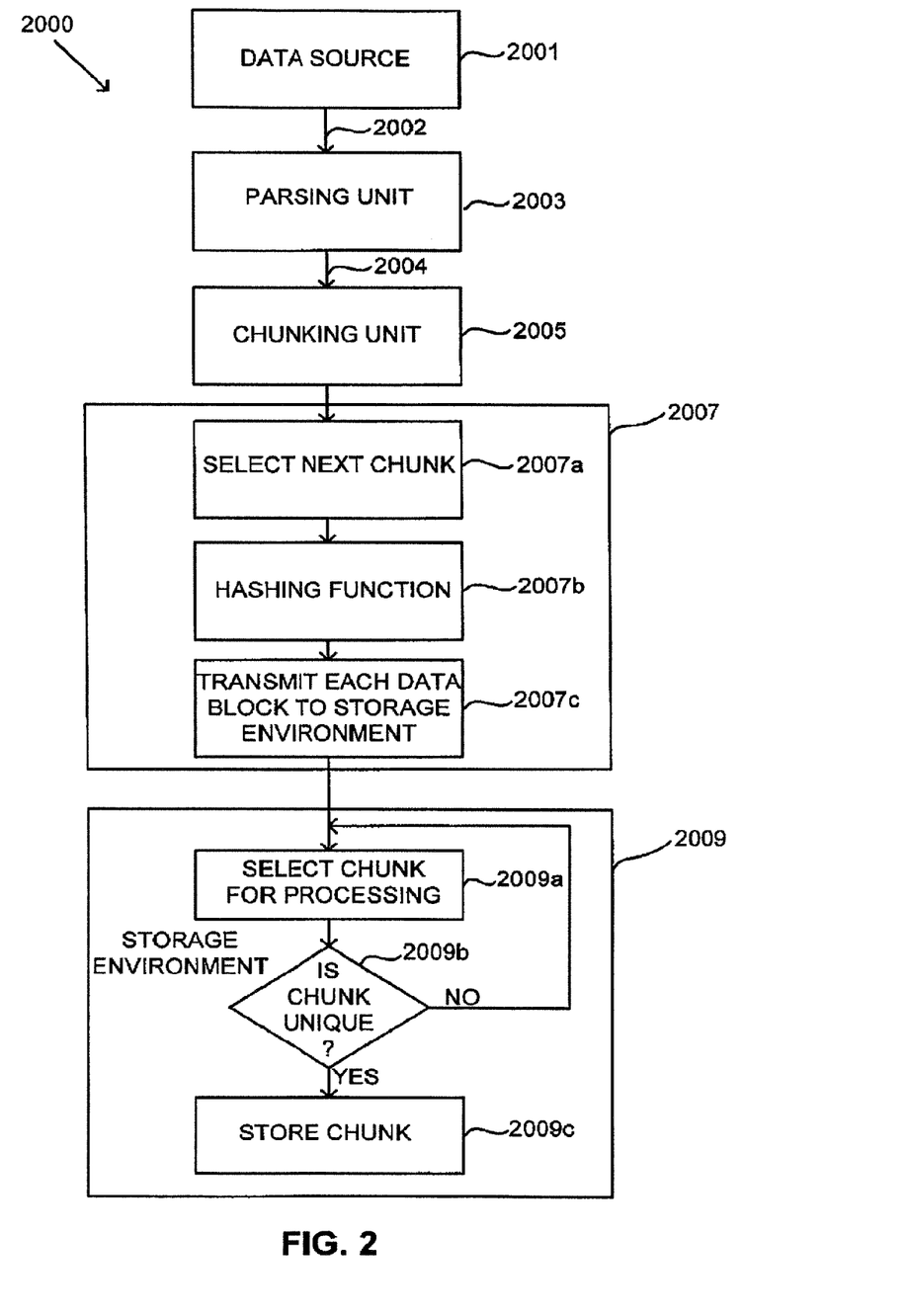
FIG. 2 is a block diagram of a system in accordance with some embodiments of the present invention in which a hashing unit forwards all data blocks to a storage environment which makes a determination of whether each block is unique prior to storing the block.

A system 2000 that performs data de-duplication in accordance with some embodiments of the present invention is illustrated in FIG. 2. The system includes a data source 2001. As discussed above, the data source may be any suitable source of data 2002. In accordance with some embodiments of the present invention, the data source 2001 may be a backup application such as the application 1001 discussed above in connection with FIG. 1, but all aspects of the present invention are not limited in this respect.

The system 2000 further includes a parsing unit 2003. The parsing unit 2003 may perform the same function discussed above in connection with the parsing unit 1003 of FIG. 1. In this respect, when the data source 2001 is a backup application, the parsing unit 2003 may remove metadata for the backup application from the data stream 2002 and produce a raw output data stream 2004 in which that metadata has been extracted. In addition, the parsing unit 2003 can control the storing of the backup application's metadata (e.g., to the storage environment 2009) so that it can be used by the backup application to access data from the storage environment 2009. It should be appreciated that in some applications, the data source 2001 may not insert any metadata into the data stream 2002 that should be extracted by a parsing unit 2003, so that the parsing unit 2003 is optional and need not be included in all computer system configurations. In addition, when a parsing unit is employed, the parsing unit can take any suitable form, as the aspects of the present invention described herein are not limited to use with any particular type of parsing unit.

The raw data stream 2004 output from the parsing unit 2003, or received directly from data source 2001 when no parsing unit is employed, is then operated upon by a chunking unit 2005 to divide the raw data 2004 into a plurality of blocks or chunks of workable size. The chunking unit can take any suitable form, as the aspects of the present invention described herein are not limited to use with a de-duplication system that employs any particular type of chunking unit 2005. Numerous types of chunking units are known, including some that divide the raw data 2004 into fixed size blocks and others that produced variably sized blocks. To achieve high performance in performing data de-duplication, consistency in the operation of the chunking unit 2005 is advantageous, so that when the chunking unit encounters duplicate data patterns in the raw data 2004, it will consistently group those data patterns into consistently sized and bounded data chunks. There are numerous types of chunking units available that can produce good performance results for a data de-duplication process, and the aspects of the present invention described herein can be used with any of them, or with any later developed chunking technologies, as the aspects of the present invention described herein are not limited in any way by the implementation of the chunking unit 2005.

The chunks output from the chunking unit 2005 are passed to a hashing unit 2007, which performs a number of functions as shown in blocks 2007a-c. Initially, in block 2007a, the hashing unit selects an individual chunk for processing. This can be accomplished in any suitable manner, as the hashing unit 2007 preferably processes all of the chunks received and may do so in any order. However, it should be appreciated that the aspects of the invention are not limited in this respect, and can be used with any type of hashing unit, including those that operate upon only a subset of the data blocks received. The selected chunk is then passed to a hashing function 2007b that creates an object identifier or content address for the selected data chunk. The hashing function 2007b may do this in any suitable manner, as the aspects of the present invention described herein are not limited to use with any particular type of hashing function, and can be used with any existing type of hashing function, including those used in conventional de-duplication systems, or any later developed hashing technologies.

In accordance with one embodiment of the present invention, it is desirable to employ a hashing function that is uniformly distributed to minimize the chances of collisions (i.e., wherein two non-identical data chunks hash to the same content address) and to distribute the content addresses generated uniformly over the full range of possible content addresses. In this respect, even distribution among the available content addresses is desirable in accordance with one embodiment of the present invention described below wherein at least some of the bits in the content address are used to select which of a plurality of distributed devices is used to perform the determination of whether a particular data block is unique, but not all aspects of the invention are limited in this respect.

In accordance with some embodiments of the present invention, the hashing unit may employ the MD5 or SHA-160 hashing algorithm, but the aspects of the present invention described herein are not limited in this respect. In addition, while the use of a hashing algorithm that generates uniformly distributed content addresses is desirable in some embodiments, it should be appreciated that this is not a limitation on all aspects of the present invention.

In accordance with one embodiment of the present invention, the content address generated for each data chunk is a sixteen byte (i.e., 128 bit) address, but it should be appreciated that the aspects of the present invention described herein are not limited in this respect, and can be employed with a hashing unit that generates a content address of any desired length.

In one embodiment, each data block is then transmitted to the storage environment by the hashing unit 2007 (at block 2007c), in contrast to conventional data de-duplication systems (e.g., the one shown in FIG. 1) wherein a determination is made in the hashing unit as to whether a data block is unique and only unique data blocks are transmitted to the storage environment. As discussed further below, in one embodiment, every data block is transmitted to the storage environment because the determination of whether a data block is unique is performed by the storage environment itself in accordance with one embodiment of the present invention. While the transmitting of each data block to the storage environment is shown in FIG. 2 as being performed by the hashing unit 2007, it should be appreciated that the embodiments of the present invention described herein are not limited in this respect, and that the function of transmitting the data blocks to the storage environment can be performed by any other aspect of the computer system 2000. In addition, while the parsing, chunking and hashing units 2003, 2005 and 2007 are shown in FIG. 2 as distinct functional units, it should be appreciated that these functional units can be implemented separately, or can all be implemented together either on the same single computer or set of distributed computers, or various portions of these functional units can be distributed among two or more computers in any suitable manner, as the aspects of the present invention described herein are not limited to use with computer systems wherein these functional components are implemented in any particular manner.

As illustrated in FIG. 2, in accordance with one embodiment, the storage environment 2009 receives each of the data blocks along with an associated content address or identifier for the data block. The storage environment 2013 determines whether a particular data block is unique. This can have a beneficial impact on the performance of the other components of the system 2000, in that the other components can continue to parse, chunk and hash the data as it arrives from the data source 2001 without being impacted by the bottleneck in the hashing unit of determining uniqueness for each content unit. That is, in conventional systems such as that shown in FIG. 1, the processing of data chunks or blocks by the hashing unit is throttled by the performance of the portion of the system that determines whether previously processed chunks or blocks are unique, which as discussed above, can be a very time-consuming process. In accordance with the embodiment illustrated in FIG. 2, the hashing unit 2007 is relieved of this obligation, and can begin processing a next data chunk as soon as the prior data chunk or block is transmitted to the storage environment. In some embodiments of the present invention described below, the storage environment 2009 is implemented in a manner to provide high throughput for the processing of the received data blocks so that the storage environment does not create a significant bottleneck in the performance of the system.

As shown conceptually in FIG. 2, the storage environment performs the function of determining whether received data blocks are unique, as shown conceptually in blocks 2009a-2009c. In the illustrative implementation in FIG. 2, the storage environment 2009 processes each and every data chunk received to determine whether it is unique or has previously been stored on the storage environment 2009. This is advantageous in that the beneficial effects of avoiding the storage of redundant data can be maximized by evaluating all received data chunks. However, it should be appreciated that the aspects of the present invention described herein are not limited in this respect, and can be employed in connection with storage environments that evaluate only a subset of the received data block for uniqueness or redundancy.

In block 2009a, a data block or chunk is selected for processing. This selection can be performed in any suitable manner, as the aspects of the present invention described herein are not limited in this respect. For example, in accordance with one embodiment of the present invention, the chunks may be processed in the order in which they are received, but the aspects of the present invention described herein are not limited in this respect, as other techniques can be employed for determining the order in which received chunks are processed. In block 2009b, a determination is made as to whether the selected chunk is unique. This determination can be made in any suitable manner, examples of which are discussed below. For example, this determination can be performed in a manner similar to that described above in connection with block 1007c in FIG. 1 by performing a table or tree look-up of the content address for the corresponding block. If it is determined in block 2009b that the data chunk is unique, the storage environment may store the new data chunk (as shown at block 2009c) in any available storage location(s) in the storage environment. The storage environment may then update a data structure maintained by the storage environment to provide a mapping between an identifier that uniquely identifies the data block and the storage location(s) on the storage environment where the block is stored to enable the storage environment to locate the data block if it is accessed in the future. This data structure can take any suitable form, as the aspects of the invention are not limited in this respect.

Conversely, if it is determined in block 2009b that a data block having the same content address is already stored in the storage environment 2009, in one embodiment the data block is not stored again to preserve storage space. Rather, the data structure that the storage environment employs to provide the mapping between an identifier for the data block and the storage location(s) where it is stored can be updated to indicate that the data block is stored at the location(s) in the storage environment where the same content was previously stored, and a reference count reflecting the number of pointers to the data block is updated. This can be done in any suitable manner, including using any of the techniques conventionally employed in systems such as that shown in FIG. 1 (e.g., by including a pointer in the data structure to the location(s) in the storage environment where the content was previously stored), as the aspects of the invention described here are not limited in this respect. The storage environment can then return to block 2009a to process the next data chunk or block.

As discussed in more detail below, in accordance with one embodiment of the present invention, the determination made in block 2009b of whether the data chunk is unique involves a process to ensure that a content address collision has not occurred that could result in an incorrect determination that a data unit not previously stored to the storage environment is not unique. It should be appreciated that such a circumstance can be problematic, as if the system makes an erroneous determination (e.g., due to a content address collision) that a data unit has already been stored to the storage environment when in fact it has not, the true data will never be stored to the storage environment, and if the storage environment is later accessed in an attempt to retrieve that data, the wrong data (i.e., different data that hashed to the same content address) will be returned. In accordance with one embodiment of the present invention, to avoid the potential for such a problem, when a determination is made that another data unit hashing to the same content address has already been stored on the storage environment, the storage environment may access that previously stored data unit and perform an actual comparison of the underlying data in any suitable way (e.g., byte-by-byte) to ensure that the data is in fact identical. If it is determined that a content address collision has occurred, the new data unit is stored to a different location in the storage environment than the other data block with which it collided. In addition, in accordance with one embodiment of the invention, the storage location for the new data unit is optionally added to the data structure (e.g., a table or tree) used to look-up content addresses and is associated with the content address so that if any additional data units are received that map to the same content address, the content of the received data unit can be compared against the content of all previously stored content units.

In accordance with one optional embodiment of the present invention, when the storage location for a new data unit is added to the data structure used to look-up content addresses after a content address collision has been detected, techniques may be employed to generate new unique identifiers for two or more data units that collided (i.e., that resulted in the same content address). This can be performed in any suitable manner, as the aspects of the present invention are not limited in this respect. For example, in one embodiment, a secondary hashing operation can be performed using a different hashing algorithm, with the expectation that the data units will not collide again using the different hashing algorithm so that it will generate distinct identifiers for the data units. This can be performed by the hashing unit or in any other respect. In accordance with this embodiment of the present invention, when a new data unit is received that maps (using the primary hashing algorithm) to a content address that is stored in the data structure and that relates to two or more distinct content units that also are identified by unique identifiers generating using a secondary hashing technique, the received data unit can be subjected to the secondary hashing technique to generate a new secondary identifier that can then be compared with the secondary identifiers or the entries in the data structure to determine whether the received data unit is unique in much the same manner as was discussed above in connection with the content address generated using the primary hashing technique.

It should be appreciated that the aspects of the invention that perform content comparisons to detect hash collisions are not limited to employing a secondary hashing technique or even to including in the data structure the storage location(s) for any subsequently detected colliding data units that map to the same content address as a data unit having a entry in the data structure, as not including the storage location for any subsequently detected data unit that maps to the same content address as a distinct data unit already stored in the data structure will not risk that any new original data is not stored to the storage environment. Rather, at worst, failing to include the storage location for any subsequently detected colliding data unit would result in multiple copies of that data unit being stored to the storage environment.

While performing additional steps to safeguard against a content address collision provides the advantages discussed above, it should be appreciated that all aspects of the present invention described herein are not limited to a system that implements such safeguards, as systems can be employed that rely upon the effectiveness of the hashing algorithm in minimizing content address collisions to such statistical infrequency that they can be effectively disregarded.

The storage environment 2009 illustrated in FIG. 2 can be implemented in any suitable manner, as aspects of the present invention described herein are not limited in this respect. However, in accordance with one embodiment of the present invention referenced above, the storage environment 2009 may be implemented in a distributed manner as shown conceptually in FIG. 3.

Figure 3:
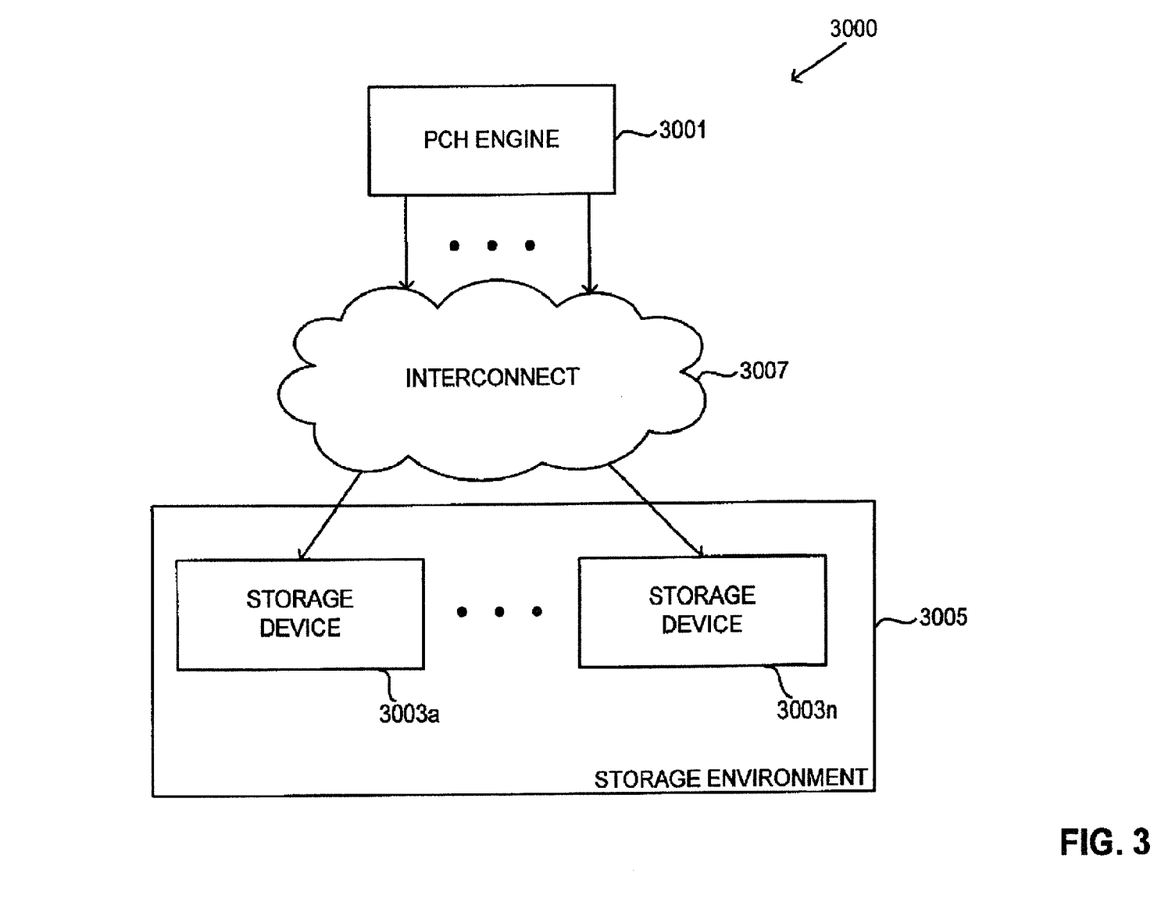
FIG. 3 is a block diagram of a system in accordance with some embodiments of the present invention in which the storage environment includes a plurality of storage devices that can operate in a distributed manner to perform determinations of whether data blocks are unique or already stored on the storage environment.

FIG. 3 illustrates a computer system 3000 that performs data de-duplication in a distributed manner in accordance with some embodiments of the present invention. The computer system 3000 includes a PCH engine 3001, which is an engine that performs the functions of each of the parsing, chunking and hashing units (e.g., 2003, 2005 and 2007 in FIG. 2) discussed above. As with the embodiments discussed above, the PCH engine 3001 can be implemented in any suitable manner, including as one or more programmed computers or processors that perform the functions of the PCH engine in any manner. In this respect, when the functions of the PCH engine are distributed across two or more computers, they can be distributed in any suitable manner, including having some computers dedicated to performing only one of the parsing, chunking and hashing functions or employing one or more computers that perform any two or three of these functions. In addition, each of the parsing, chunking and hashing units can be implemented in any suitable manner as discussed above, and it should be appreciated that the parsing function is optional, as the data de-duplication system 3000 may in some embodiments be used with a data source that provides data that needs no parsing before being divided into chunks.

The PCH engine 3001 is connected to a plurality of storage devices 3003a-3003n, wherein "n" can be any desired number. In this respect, any number of storage devices 3003 can be employed, including two, ten, fifty, 100 or more. The storage devices 3003 may distribute the function of determining whether a data unit has previously been stored to the storage environment 3005 as discussed further below.

The PCH engine 3001, or any subcomponent thereof, can be connected to the storage environment 3005 via any suitable interconnect 3007. In accordance with one embodiment of the present invention, the interconnect 3007 may be implemented using gigabit Ethernet, but it should be appreciated that other types of connection technologies (e.g., Fibre Channel or other suitable connection technologies) can be employed, as the aspects of the invention described herein are not limited to use with systems that employ any particular type of interconnect technology.

Figure 4:
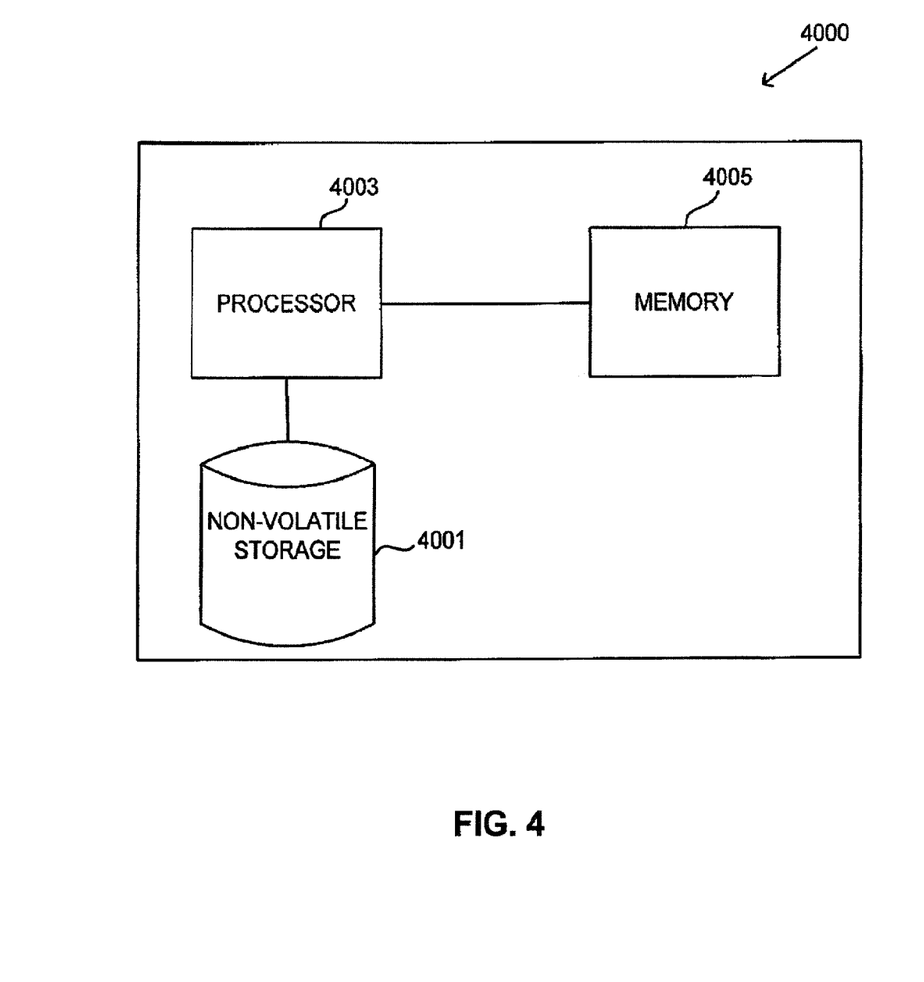
FIG. 4 is a block diagram of a storage device on which aspects of the present invention can be implemented.

The storage devices 3003 can take any suitable form, as aspects of the present invention described herein are not limited in this respect. An illustrative implementation of a storage device 4000 that can be used in connection with one embodiment of the present invention is shown in FIG. 4. The storage device 4000 includes one or more non-volatile storage medium 4001, which can be formed of any suitable non-volatile data storage medium. In accordance with one embodiment of the present invention, the storage device 4000 may be a disk drive, and the non-volatile storage medium 4001 may comprise one or more rotating magnetic disks of storage. However, it should be appreciated that the aspects of the present invention described herein are not limited to use with storage devices that comprises a disk drive, nor to storage devices that employ rotating magnetic disks as the storage medium. In addition to or instead of using a rotating magnetic disk, other types of non-volatile storage media can be used, including flash memory or any other suitable non-volatile storage media.

The storage device 4000 further includes a processor 4003 and a memory 4005. The processor 4003 may control writing data to and reading data from the non-volatile storage device 4001 in any suitable manner, as the aspects of the present invention described herein are not limited in this respect. To perform any of the functionality described herein, the processor 4003 may execute one or more instructions stored in the memory 4005, which serves as a computer-readable storage medium storing instructions for execution by the processor 4003.

In accordance with one embodiment of the present invention, in addition to controlling access to data stored on the non-volatile storage device 4001, the processor 4003 may also be programmed (e.g., by instructions in the memory 4005) to receive a content address or other identifier for a chunk or block of data to be stored by the storage device 4000, and to make a determination of whether the storage environment already stores a data block or unit having the same object identifier. This determination can be performed in any suitable manner, as the aspects of the present invention described herein are not limited in this respect. In one non-limiting example, one or more data structures may be stored on the storage device 4000, and the processor 4003 may access the data structure(s) to determine whether a particular content address is included therein, indicating that the corresponding data unit has already been stored on the storage environment.

Figure 5:
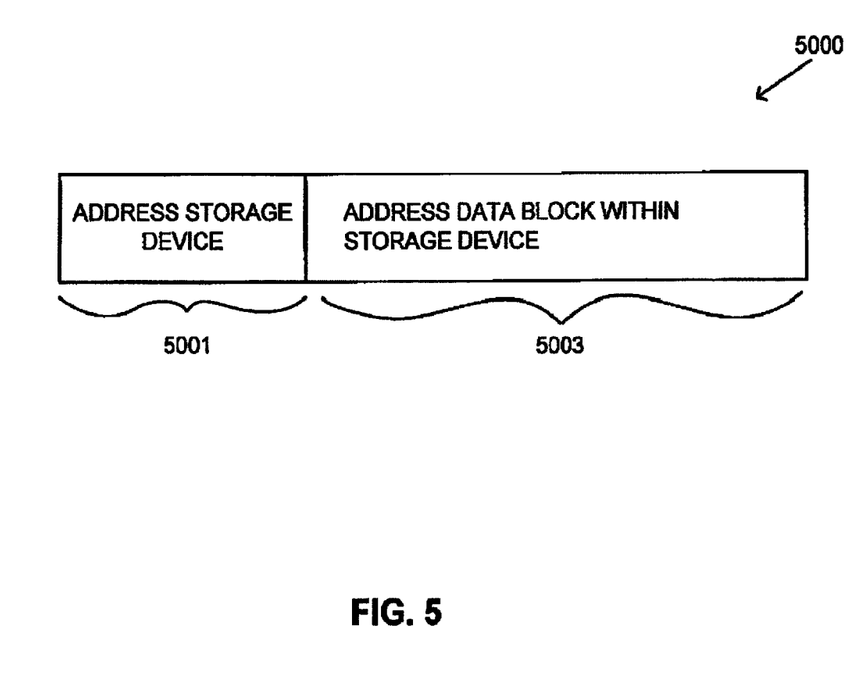
FIG. 5 illustrates a content address for a data block being conceptually divided into one part that addresses a particular storage device and another part that addresses the data block within that storage device in accordance with some embodiments.

As discussed above, in accordance with one embodiment of the present invention, the responsibility of determining whether data blocks have already been stored to the storage environment 3005 may be distributed across multiple storage devices 3003 (FIG. 3). This distributed and shared responsibility can be implemented in numerous ways, as the aspects of the present invention described herein are not limited in this respect. In accordance with one embodiment of the present invention illustrated in FIG. 5, the content address 5000 for a data block can conceptually be divided into two parts, a first part 5001 that can be used to address or assign the corresponding content unit to a particular one of the plurality of storage devices (e.g., one of storage devices 3003a-n in FIG. 3) and a second part 5003 that can be used to address or access the data block within the storage device. While the part 5001 used to address or identify a particular storage device is shown in FIG. 5 as the highest order bits in the content address 5000, it should be appreciated that the aspects of the present invention are not limited in this respect, and that any portion or portions of the content address (including contiguous or non-contiguous bits) can form the part 5001 used to address or select a particular storage device, with the remainder of the bits being used to address a data block within a storage device.

It should be appreciated that by assigning a subset of the range of content addresses or object identifiers for the data chunks to each of a plurality of storage devices, performance improvements are achieved for at least two reasons. First, the address range across which each particular storage device is responsible for searching to determine if a newly received identifier is unique is dramatically reduced (as compared to having to search the full range), which can result in improved performance for this identification step as discussed further below. Second, the multiple storage devices can operate in parallel to perform searching for a plurality of object identifiers, thereby achieving greater performance and throughput than is achieved in prior art systems where a single component (e.g., the hashing unit 1007 in FIG. 1) is responsible for processing the object identifiers for all of the content units to determine whether they are unique.

A simple example illustrates both of these benefits. Referring to the illustrative implementation in FIG. 3, the storage environment 3005 comprises "n" storage devices 3003, where "n" can be any desired number. For example, if it is assumed that "n"=4, then two bits of the content address can be used as the portion 5001 (FIG. 5) that assigns each content address to one of the four storage devices 3003. In this manner, each of the storage devices 3003 would have the responsibility of determining uniqueness for only one quarter of the full range of content addresses or object identifiers. If the hashing algorithm used is evenly distributed, then each of the four storage devices 3003 will have the responsibility of determining uniqueness for one quarter of the content units sourced to the storage environment 3005, and the four storage devices 3003 can operate in parallel, so that the storage environment 3005 may simultaneously determine whether four data chunks or blocks sourced to the storage environment 3005 are unique or duplicative. If each of the storage devices was able to perform this identification at the same rate as the hashing unit (e.g., 1007 in FIG. 1) in conventional systems, a performance of improvement of approximately "n" times (e.g., four times in the example being described) could be achieved. However, in accordance with some embodiments of the present invention, even further performance improvements are achieved because, as discussed further below, reducing the number of content addresses that are searched for uniqueness for any particular entity performing the search can result in improved searching performance.

A storage device (e.g., 4000 in FIGS. 4 and 3003 in FIG. 3) in accordance with some embodiments of the present invention can make a determination of whether a data unit having a content address or object identifier within its assigned range has been stored to the storage environment (e.g., 3005 in FIG. 3) in any suitable manner. For example, the storage devices may each store a data structure that can be accessed to determine whether a corresponding data unit has previously been stored to the storage environment. The data structure can take any suitable form, as the aspects of the invention described herein are not limited to use with any particular types of data structures. Examples of such data structures include a tree structure, a hash table, any of the data structures conventionally employed in de-duplication systems (e.g., by the hashing unit 1007 in FIG. 1) or any other suitable searchable data structure, as the aspects of the present invention described herein are not limited to use with any particular type of searchable data structure.

When a data structure similar to any of those used in conventional de-duplication systems is employed, the data structure will be approximately 1/n the size of the corresponding data structure that would have been employed in the conventional system, wherein n is the number of devices that share responsibility for determining uniqueness for the full range of object identifiers or content addresses, with each being responsible for 1/n of the range of content addresses. Depending upon the nature of the data structure and the manner in which it is searched, reducing the size of the data structure to be searched can result in improved searching performance. For example, if a tree structure is employed, the fewer levels to the tree structure, the quicker the performance in searching through the entire structure. In addition, when the data structure is sufficiently small that it can fit within the memory of the storage device (e.g., the memory 4005 in FIG. 4) performance improvements can be achieved in that the processor need not access a non-volatile storage medium (e.g., storage medium 4001) to retrieve the data structure, which typically has a longer data access time than memory.

As discussed above, in accordance with one embodiment of the present invention, one or more of the storage device in the storage environment (e.g., 3003 in FIGS. 3 and 4000 in FIG. 4) can be a disk drive, which conventionally includes processing capabilities that can be leveraged to perform the functions described herein of determining whether a received content address corresponds to a data block previously stored to the storage environment. A benefit to employing disk drives is that they are relatively inexpensive. However, it should be appreciated that the aspects of the present invention described herein are not limited to the use of a disk drive to implement the storage devices, as any suitable storage device can be employed.

It should be appreciated that one of the benefits of the embodiment of the present invention described herein that employs distributed storage devices to make the determination of whether a content address sourced to the storage environment relates to a previously stored data block is scalability. While the example discussed above referenced the use of a relatively small number of storage devices (e.g., "n"=four), the number of storage devices employed can be any suitable number, including numbers far greater than four, such as tens or hundreds of storage devices that provide even greater parallelism and improved performance. In addition, in view of the distributed nature of the architecture, the architecture can be scaled up by adding any desired number of storage devices to handle data sets of any desired size. In accordance with some embodiments of the present invention, the distributed storage devices can be very loosely coupled to form a storage environment, and in some embodiments, need not communicate with each other at all.

As discussed above, while one illustrative use of the techniques described herein is in a backup storage environment, the aspects of the present invention described herein are not limited in this respect, and can be used with any suitable type of storage environment. In addition, while the functions of the parsing, chunking and hashing units are described above as being distinct from the storage environment, it should be appreciated that in some aspects of the present invention, these capabilities can all be integrated together in a larger storage system. The larger storage system can be any type of storage system providing any type of interface to one or more hosts or other entities that access data therefrom. For example, the aspects of the present invention described herein can be employed to provide data de-duplication capabilities for a block I/O storage system, a content addressable storage system, a Network Attached Storage system or any other type of storage system. For example, the aspects of the present invention can be integrated below a higher level interface that allows data to be sourced to and/or accessed from the storage environment, and can then perform the chunking and hashing functions described herein to divide any logical object (e.g., a file, a database record or table, etc.) into smaller level data blocks and can evaluate them to achieve data de-duplication as discussed herein, thereby minimizing the storage resources used by the storage system.

As discussed above, in accordance with one embodiment of the present invention, techniques can be employed to guard against content address collisions by doing a comparison of the data in two data blocks that have identical content addresses. In the embodiment wherein the storage devices are implemented via a disk drive, the accessing of the stored content unit can be done efficiently by the disk drive. The disk drive knows where the underlying data is stored and when the non-volatile storage medium is a spinning disk drive, can optimize the seeking operations to efficiently retrieve the data for comparison purposes. In addition, for embodiments wherein the storage device makes the determination of whether a data unit has previously been stored, performance improvements are gained by minimizing input/output communications in reading the previously stored data to process it.

In accordance with some embodiments of the present invention, techniques can be employed to provide fault tolerance for the data stored in the storage environment 3005. Any suitable techniques can be employed for providing such fault tolerance and protecting against failure, as aspects of the present invention described herein are not limited to use of any particular technique. In accordance with some embodiments of the present invention, storage devices that have a built in fault tolerance capability (e.g., RAID) can be employed to implement the storage environment. In accordance with another embodiment of the present invention, if the underlying storage devices do not have fault tolerance capabilities, mirror techniques can be employed to provide fault tolerance. For example, the data stored on each storage device can be mirrored to another storage device that can be used to recover in the event of a failure. Alternatively, techniques such as those specified by the Storage Networking Industry Association (SNIA) Common RAID Disk Data Format (DDF) standard can be used, or any other suitable technique can be employed, as the aspects of the invention described herein are not limited to any particular data protection technique.

In the embodiment shown in FIG. 3, a single PCH engine 2001 is employed. However, it should be appreciated that the aspects of the present invention described herein are not limited in this respect, and that a number of independent PCH engines can be employed. Employing multiple PCH engines can provide parallelism and performance improvement in much the same manner as providing multiple storage devices as discussed above. In accordance with one embodiment of the present invention, when multiple PCH engines are employed, they can be entirely independent, which increases the scalability of the system. In this respect, each PCH engine need only respond to the data input provided to it, and source data chunks to the appropriate storage devices assigned to each range of content addresses, but need not be aware of the performance of any parallel PCH engines.

As discussed above, in accordance with one embodiment of the present invention, the storage devices can be implemented as a disk drive or other storage device that includes a processor. It should be appreciated that this is advantageous, in that when the system is scaled by adding increased storage capacity, doing so also adds additional processing capabilities that can perform in parallel.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer storage environment comprising:
at least one data processing unit programmed to receive input data from at least one source, wherein the at least one data processing unit is enabled to process at least some of the input data to output data blocks from the at least some of the input data and an identifier for each of the data blocks, wherein an identifier for a corresponding data block comprises a content address that is generated based on a function of the content of the corresponding data block;
object addressable storage devices configured to store at least some of the data blocks output from the at least one data processing unit; and
at least one processor programmed to, for each of the data blocks output from the at least one data processing unit, make a determination as to which of the object addressable storage devices is to control storage of the data blocks output from the at least one data processing unit;
wherein each of the object addressable storage devices comprises at least one processor programmed to:
maintain a map between identifiers for data blocks, derived from the content of the data blocks with the function, and storage locations within the object addressable storage environment at which the contents of the data blocks are stored; and
process at least one of the data blocks on the object addressable storage device at least in part by:
determining whether a corresponding content address of the at least one of the data blocks on the object addressable storage device matches the content address of another data block stored on the computer storage environment using the map; and
storing the at least one of the data blocks on the object addressable storage device such that the at least one of the data blocks is accessible to the computer storage environment using the corresponding content address when it is determined that the corresponding content address of the at least one of the data blocks does not match the content address of another data block stored on the computer storage environment such that storage of the at least one of the data blocks on the computer storage environment is controlled by the object addressable storage device so as not to duplicate another data block previously stored on the computer storage environment.

2. The computer storage environment of claim 1, wherein the at least one processor of each one of the object addressable storage devices is programmed to:
control storage of the at least one of the data blocks on the object addressable storage devices.

3. The computer storage environment of claim 1, wherein the at least one data processing unit comprises at least one processor programmed to output every one of the data blocks to the object addressable storage devices without making a determination of whether any of the data blocks is a duplicate of another data block previously stored on the computer storage environment.

4. The computer storage environment of claim 1, wherein at least one of the object addressable storage devices is a flash memory.

5. The computer storage environment of claim 1, wherein the at least one processor in the computer storage environment is programmed to make the determination as to which of the object addressable storage devices is to control storage of the data blocks output from the at least one data processing unit is programmed to make the determination based upon the identifier of the data blocks output from the at least one data processing unit.

6. The computer storage environment of claim 5, wherein the at least one data processing unit comprises the at least one processor programmed to make the determination as to which of the object addressable storage devices is to control storage of the data blocks output from the at least one data processing unit based upon the identifiers of the data blocks output from the at least one data processing unit.

7. The computer storage environment of claim 1, further comprising the at least one source of the input data, wherein the at least one source comprises at least one backup server configured to backup data stored on at least one primary storage system.

8. The computer storage environment of claim 1, wherein the map comprises a hash table or a tree structure.

9. The computer storage environment of claim 1, wherein the output data blocks have a predetermined size such that the identifiers for corresponding data blocks are computed for data blocks of the predetermined size.

10. The computer storage environment of claim 1, wherein the content address comprises a first portion indicative of a storage destination of the corresponding data block and a second portion that is generated based on the function of the content of the corresponding data block.

11. The computer storage environment of claim 1, wherein the at least one processor is programmed to, for each of the data blocks output from the at least one data processing unit, make the determination as to which of the object addressable storage devices is to control storage of the data blocks output from the at least one data processing unit using the content addresses for the data blocks output from the at least one data processing unit.

12. The computer storage environment of claim 1, wherein the at least one data processing unit processes at least some of the input data to output data blocks at least partially in parallel with at least one the object addressable storage devices processing the at least one of the data blocks on the object addressable storage device.

13. A computer-executable method, comprising:
processing, at a storage server, input data including data blocks, wherein the processing includes creating an identifier for a data block of the data blocks, wherein the identifier comprises a content address that is generated based on a function of the content of the data block;
processing the data block at a first object addressable storage device of object addressable storage devices, wherein the first object addressable storage device is determined based upon the identifier of the data block;
wherein the first object addressable storage device:
  maintains a map between identifiers for data blocks, derived from the content of the data blocks with the function, and storage locations within the object addressable storage devices at which the contents of the data blocks are stored; and
  process at least one of the data blocks on the first object addressable storage device at least in part by:
    determining whether a corresponding content address of the at least one of the data blocks on the first object addressable storage device matches the content address of another data block stored on the object addressable storage devices using the map;
    storing the at least one of the data blocks such that the at least one of the data blocks is accessible using the corresponding content address when it is determined that the corresponding content address of the at least one of the data blocks does not match the content address of another data block stored on the object addressable storage devices such that storage of the at least one of the data blocks is controlled by the object addressable storage device so as not to duplicate another data block previously stored on the object addressable storage devices.

14. The method of claim 13, wherein the data block to which the function is applied has a predetermined size.

15. The method of claim 13, wherein processing the input data including data blocks at the storage server is performed at least partially in parallel with processing the at least one of the data blocks at the first object addressable storage device.

* * * * *